(12) United States Patent
Griffiths et al.

(10) Patent No.: US 10,773,283 B2
(45) Date of Patent: Sep. 15, 2020

(54) WANDS FOR GAS TURBINE ENGINE CLEANING

(71) Applicant: Rolls-Royce Corporation, Indianapolis, IN (US)

(72) Inventors: George F. Griffiths, Southlake, TX (US); Prahlad R. D. Heggere, Carmel, IN (US); Jeffrey A. Green, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 159 days.

(21) Appl. No.: 15/790,784

(22) Filed: Oct. 23, 2017

(65) Prior Publication Data

US 2018/0043400 A1 Feb. 15, 2018

Related U.S. Application Data

(63) Continuation of application No. 14/749,177, filed on Jun. 24, 2015, now Pat. No. 9,821,349.

(Continued)

(51) Int. Cl.
| | |
|---|---|
| *B08B 9/00* | (2006.01) |
| *F01D 25/00* | (2006.01) |
| *B05B 7/04* | (2006.01) |
| *B01F 5/04* | (2006.01) |
| *B01F 3/04* | (2006.01) |
| *B64F 5/30* | (2017.01) |
| *B08B 3/00* | (2006.01) |
| *B08B 3/02* | (2006.01) |

(52) U.S. Cl.
CPC ............ *B08B 9/00* (2013.01); *B01F 3/04446* (2013.01); *B01F 5/0406* (2013.01); *B01F 5/0428* (2013.01); *B05B 7/0408* (2013.01); *B05B 7/0425* (2013.01); *B08B 3/003* (2013.01); *B08B 3/02* (2013.01); *B64F 5/30* (2017.01); *F01D 25/002* (2013.01); *B01F 2005/044* (2013.01)

(58) Field of Classification Search
CPC ............ B01F 2005/044; B01F 3/04446; B01F 5/0406; B01F 5/0428; B05B 7/0408; B05B 7/0425; B08B 3/003; B08B 3/02; B08B 9/00; B08B 9/0322; B08B 9/04; B08B 9/027; B08B 9/053; B08B 9/055; B08B 9/0557; B08B 9/0433; B64F 5/30; F01D 25/002; E03C 1/304; F16L 55/128

See application file for complete search history.

(56) References Cited

U.S. PATENT DOCUMENTS

| | | |
|---|---|---|
| 2,273,984 A | 2/1942 | Osborn |
| 3,623,668 A | 11/1971 | Freid et al. |

(Continued)

FOREIGN PATENT DOCUMENTS

| | | |
|---|---|---|
| DE | 102008047493 A1 | 4/2010 |
| EP | 1513085 A1 | 3/2003 |

(Continued)

*Primary Examiner* — Douglas Lee
(74) *Attorney, Agent, or Firm* — Barnes & Thornburg LLP

(57) ABSTRACT

Wands are used as parts of cleaning systems to conduct cleaning agents into gas turbine engine cores. Wands according to the present disclosure include inlet assemblies adapted to connect to cleaning agents, dispensers adapted to discharge cleaners into gas turbine engines, and conduits that extend from the inlet assemblies to the dispensers.

18 Claims, 5 Drawing Sheets

Related U.S. Application Data

(60) Provisional application No. 62/048,625, filed on Sep. 10, 2014.

(56) References Cited

U.S. PATENT DOCUMENTS

| | | | |
|---|---|---|---|
| 3,778,170 A | | 12/1973 | Howell et al. |
| 4,025,360 A | * | 5/1977 | Horne ................. E03F 9/00 |
| | | | 134/24 |
| 4,314,671 A | | 2/1982 | Briar |
| 4,580,635 A | * | 4/1986 | Radford ............. E21B 37/02 |
| | | | 15/104.05 |
| 4,834,912 A | | 5/1989 | Hodgens, II et al. |
| 5,213,263 A | | 5/1993 | Corona |
| 5,679,174 A | | 10/1997 | Buongiorno |
| 5,797,993 A | * | 8/1998 | Woehleke ......... B08B 9/0557 |
| | | | 134/22.12 |
| 6,126,089 A | | 10/2000 | Williamson et al. |
| 6,478,033 B1 | | 11/2002 | Foster |
| 6,659,715 B2 | | 12/2003 | Kuesters et al. |
| 7,033,135 B2 | | 4/2006 | Mortzheim et al. |
| 7,033,979 B2 | | 4/2006 | Herwig et al. |
| 8,245,952 B2 | | 8/2012 | de la Brure-Terreault et al. |
| 8,303,243 B2 | | 11/2012 | Fish et al. |
| 8,337,630 B2 | | 12/2012 | de la Brure-Terreault et al. |
| 8,479,754 B2 | | 7/2013 | Hjerpe |
| 8,523,514 B2 | | 9/2013 | Eastwood et al. |
| 9,821,349 B2 | * | 11/2017 | Griffiths ............... B01F 5/0406 |
| 2005/0096832 A1 | | 5/2005 | Takada et al. |
| 2006/0289679 A1 | | 12/2006 | Johnson et al. |
| 2010/0212703 A1 | | 8/2010 | de la Bruere-Terreault et al. |
| 2011/0005554 A1 | | 1/2011 | Du Plessis |
| 2012/0134777 A1 | | 5/2012 | Eleftheriou et al. |
| 2014/0144151 A1 | | 5/2014 | Bifulco |
| 2014/0174474 A1 | | 6/2014 | Ekanayake et al. |
| 2015/0122292 A1 | | 5/2015 | McDermott |
| 2016/0067750 A1 | | 3/2016 | Griffiths et al. |

FOREIGN PATENT DOCUMENTS

| | | | |
|---|---|---|---|
| EP | 2492199 A2 | 8/2013 | |
| ES | 2362964 T3 | 7/2001 | |
| GB | 2207210 A | 1/1989 | |
| WO | WO-9742691 A1 * | 11/1997 | ............ H02G 1/086 |
| WO | 2005077554 A1 | 8/2005 | |
| WO | 2010011886 A1 | 1/2010 | |
| WO | 2013017854 A1 | 2/2013 | |
| WO | 2015051146 A1 | 4/2015 | |

\* cited by examiner

WANDS FOR GAS TURBINE ENGINE CLEANING

CROSS REFERENCE TO RELATED APPLICATIONS

This application is a continuation of U.S. application Ser. No. 14/749,177 that claims priority to and the benefit of U.S. Provisional Patent Application No. 62/048,625, filed 10 Sep. 2014, the disclosures of which are now both expressly incorporated herein by reference.

FIELD OF THE DISCLOSURE

The present disclosure relates generally to gas turbine engines, and more specifically to cleaning systems for gas turbine engines.

BACKGROUND

Gas turbine engines are used to power aircraft, watercraft, generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where energy is extracted to drive the compressor and the fan. Leftover products of the combustion are exhausted out of the engine core to provide additional thrust.

Dirt and grime accumulates within gas turbine engines from atmospheric air ingested and fuel burned during operation. As dirt and grime build up in turbofan engines, the performance of those engines may be reduced due to aerodynamic and frictional losses. To reduce the dirt and grime in a turbofan gas turbine engine, a cleaning agent (usually water) may be sprayed into engine core. Wands are sometimes used to spray cleaning agents into these engine cores.

SUMMARY

The present disclosure may comprise one or more of the following features and combinations thereof.

According to one aspect of the present disclosure, a wand for providing foamed cleaner to a gas turbine engine core is taught. The wand may include an inlet assembly, a dispenser, and a conduit that extends from the inlet assembly to the aeration dispenser. The inlet assembly may include a first connector adapted to be coupled to a liquid water source and a second connector adapted to be coupled to a foaming cleaner source. The conduit may be adapted to carry liquid water and foaming cleaner from the inlet assembly to the dispenser when the inlet assembly is coupled to a liquid water source and a foaming cleaner source.

In some embodiments, the dispenser may be an aeration dispenser. The aeration dispenser may be adapted to mix liquid water from the inlet assembly, foaming cleaner from the inlet assembly, and air from the atmosphere to produce foamed cleaner.

In some embodiments, the conduit forms a J shape. In some embodiments, the aeration dispenser may include a coupling that forms a water passage in fluid communication with the conduit and a foaming cleaner passage in fluid communication with the conduit, a regulator mounted for movement relative to the coupling to selectively restrict the foaming cleaner passage, and an actuator coupled to the coupling and to the regulator.

In some embodiments, the water passage may be coaxial with the foaming cleaner passage. The coupling may be formed to include an aeration passage that extends from the water passage to the foaming cleaner passage. The regulator may include an atmospheric passage adapted to move relative to the coupling to selectively couple the aeration passage with the atmosphere around the aeration dispenser.

In some embodiments, the inlet assembly may include a first valve. The first valve may be coupled to the first connector and adapted to selectively block or allow fluid to move through the first connector and into the conduit.

In some embodiments, the inlet assembly may include a second valve. The second valve may be coupled to the second connector and adapted to selectively block or allow foaming cleaner to move through the second connector and into the conduit.

In some embodiments, the conduit may include a first tube coupled to the first connector and a second tube coupled to the second connector. The first tube may be coaxial with the second tube.

In some embodiments, the wand may include an inlet filler coupled to the conduit between the inlet assembly and the aeration dispenser. The inlet filler may be expandable from a stowed configuration in which the inlet filler is collapsed toward the conduit to a use configuration in which the inlet filler extends away from the conduit. The inlet filler may include at least one inflatable bladder that expands outwardly from the conduit when filled with a gas.

According to another aspect of the present disclosure, another wand for providing foamed cleaner to a gas turbine engine core is taught. The wand may include an inlet assembly, a dispenser, and a conduit. The inlet assembly may be adapted to be coupled to a liquid source. The dispenser may be spaced apart from the inlet and may be adapted discharge liquid received by the inlet assembly. The conduit may extend from the inlet assembly to the dispenser.

In some embodiments, the wand may include an inlet filler coupled to the conduit between the inlet assembly and the dispenser. The inlet filler may be expandable from a stowed configuration in which the inlet filler is collapsed toward the conduit to a use configuration in which the inlet filler extends away from the conduit.

In some embodiments, the inlet filler may include at least one inflatable bladder that expands outwardly from the conduit when filled with a gas. The inlet filler may extend all the way around the conduit.

In some embodiments, the conduit may include a first tube and a second tube. The first tube may be fluidly coupled to the inlet assembly and to the dispenser to conduct fluid from the inlet assembly to the dispenser. The second tube may be fluidly coupled to the at least one inflatable bladder to conduct gas to the at least one inflatable bladder.

In some embodiments, the dispenser may be an aeration dispenser. The aeration dispenser may be adapted to mix liquid, foaming cleaner, and air from the atmosphere to produce foamed cleaner.

According to another method of the present disclosure, a method of cleaning a gas turbine engine is taught. The method may include coupling a wand to a foaming cleaner source, and discharging foamed cleaner produced by mixing foaming cleaner with air into a gas turbine engine.

In some embodiments, the foamed cleaner may be produced from the foaming cleaner by an aeration dispenser forming an end of the wand. The aeration dispenser may include a coupling that forms a foaming cleaner passage in fluid communication with the foaming cleaner source and a regulator mounted for movement relative to the coupling to selectively restrict the foaming cleaner passage.

In some embodiments, the method may include expanding an inlet filler within an air inlet coupled to the gas turbine engine to block leakage of the foamed cleaner out of the inlet without passing through the gas turbine engine. The inlet filler may include at least one inflatable bladder These and other features of the present disclosure will become more apparent from the following description of the illustrative embodiments.

DETAILED DESCRIPTION OF THE DRAWINGS

Figure 1:
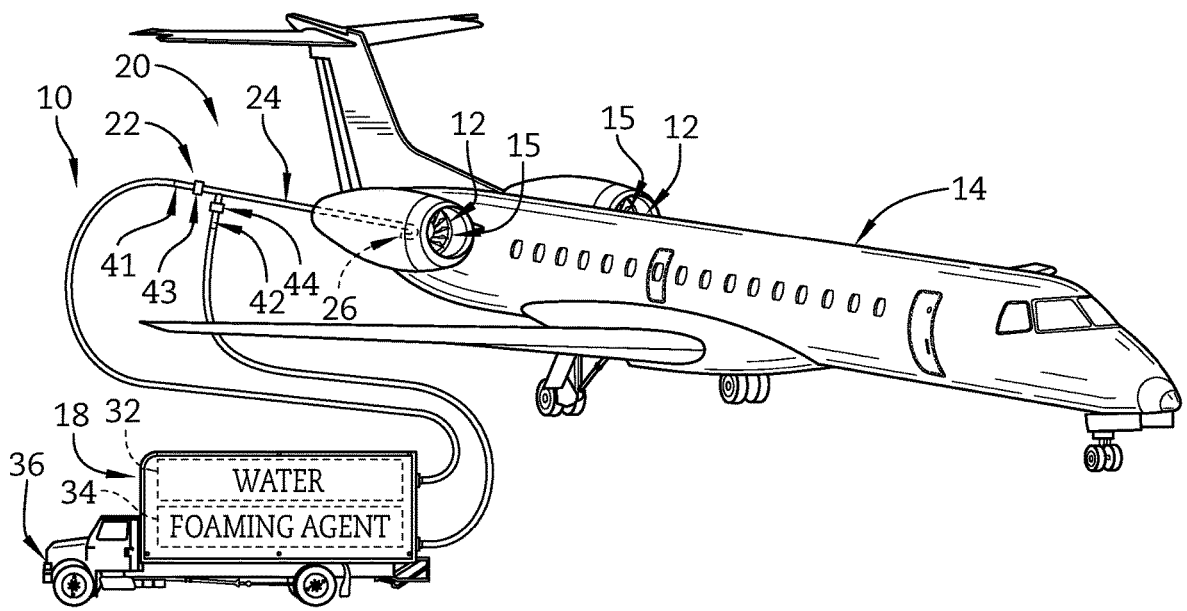
FIG. 1 is a perspective view of an aircraft and a cleaning system which includes a wand with an aeration dispenser for discharging foamed cleaner into the gas turbine engine.

For the purposes of promoting an understanding of the principles of the disclosure, reference will now be made to a number of illustrative embodiments illustrated in the drawings and specific language will be used to describe the same.

An illustrative cleaning system 10 adapted for cleaning gas turbine engines 12 used in an aircraft 14 is shown in FIG. 1. The cleaning system 10 includes a mobile supply unit 18 and a wand 20 coupled to the supply unit 20. The wand 20 is configured to produce foamed cleaner and to discharge the foamed cleaner into the gas turbine engines 12 so that the foamed cleaner can remove dirt and grim built up in the turbine engines 12.

The wand 20 of the illustrative embodiment sprays foamed cleaner into the gas turbine engines 12 while the rotating components of the engines 12 are dry motored so that the foamed cleaner is pulled through the engines 12 as suggested in FIG. 1. More specifically, the illustrated wand 20 is a J-hook type wand that sprays foamed cleaner into an engine core 16 of the gas turbine engine 12 while bypassing a fan 15 driven by the engine core 16 as suggested in FIGS. 1 and 2. By bypassing the fan 15, the foamed cleaner is not pushed outwardly during dry motoring such that a significant amount of the foamed cleaner does not interact with the dirty internal components of the engines 12.

Figure 2:
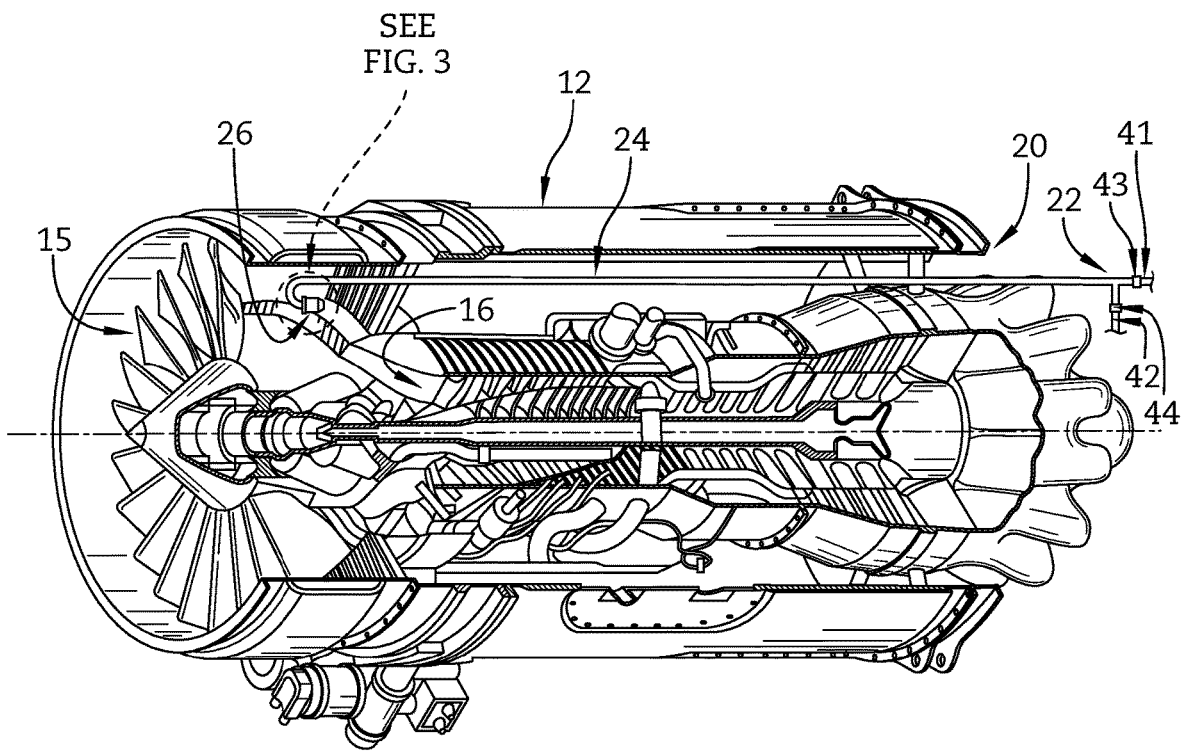
FIG. 2 is a perspective view of a gas turbine engine of the type used in the aircraft of FIG. 1 cut away to show the wand of FIG. 1 has a J-shape so that when the wand may be inserted into the engine to conduct foamed cleaner into the engine core without interacting with a fan included in the engine.

The wand 20 illustratively includes an inlet assembly 22, a conduit 24 that extends from the inlet assembly 22, and an aeration dispenser 26 as shown in FIGS. 1 and 2. The inlet assembly 22 illustratively connects to and may regulate the mobile supply unit 18. The conduit 24 conducts contents of the mobile supply unit 18 to the aeration dispenser 26. The aeration dispenser 26 mixes contents of the mobile supply unit 18 with air to produce foamed cleaner at the point where the wand 20 discharges into the gas turbine engines 12 so that the cellular integrity of the foamed cleaner is maximized during cleaning of the gas turbine engines 12.

The mobile supply unit 18 included in the cleaning system 10 illustratively includes a water supply 32 and a foaming cleaner supply 34 mounted to a transport vehicle 36 as shown in FIG. 1. The water supply 32 illustratively stores and provides de-ionized water to the wand 20. The foaming cleaner supply 34 stores and provides a foaming cleaner to the wand 20. For illustrative purposes, the mobile supply unit 18 is shown in the back of a truck; however, in other embodiments, the mobile supply unit 18 may be incorporated into a work cart, trailer, or the like.

The inlet assembly 22 of the wand 20 is adapted to be coupled to the water supply 32 and the foaming cleaner supply 34 of the mobile supply unit 18 as shown in FIG. 1. The inlet assembly 22 illustratively includes a first connector 41 adapted to be coupled to the liquid water source 32 and a second connector 42 adapted to be coupled to the foaming cleaner source 34. In the illustrative embodiment, the inlet assembly 22 also includes a first valve 43 and a second valve 44. The first valve 43 first valve is coupled to the first connector 41 and is adapted to selectively block or allow fluid movement through the first connector 41 and into the conduit 24. The second valve 44 is coupled to the second connector 42 and adapted to selectively block or allow foaming cleaner movement through the second connector 42 and into the conduit 24. Thus, the inlet assembly 22 may be configured to regulate water and foaming cleaner flow from the mobile supply unit 18.

The conduit 24 illustratively extends from the inlet assembly 22 to the aeration dispenser 26 to carry liquid water and foaming cleaner from the inlet assembly 22 to the aeration dispenser 26 as suggested in FIGS. 1 and 2. The conduit 24 forms a J shape such that the wand 20 is of the J-hook type. The conduit 24 includes a first tube 51 coupled to the first connector 41 and a second tube 52 coupled to the second connector 42. In the illustrative embodiment, the first tube 51 is coaxial with the second tube 52 as suggested in FIGS. 3 and 4. The conduit 24 may be straight or may have other geometries depending upon the aircraft and/or engine the wand 20 will be used with. In some embodiments, the conduit 24 may even be bendable to take on a desired shape and/or to slide into an engine inlet.

Figure 3:
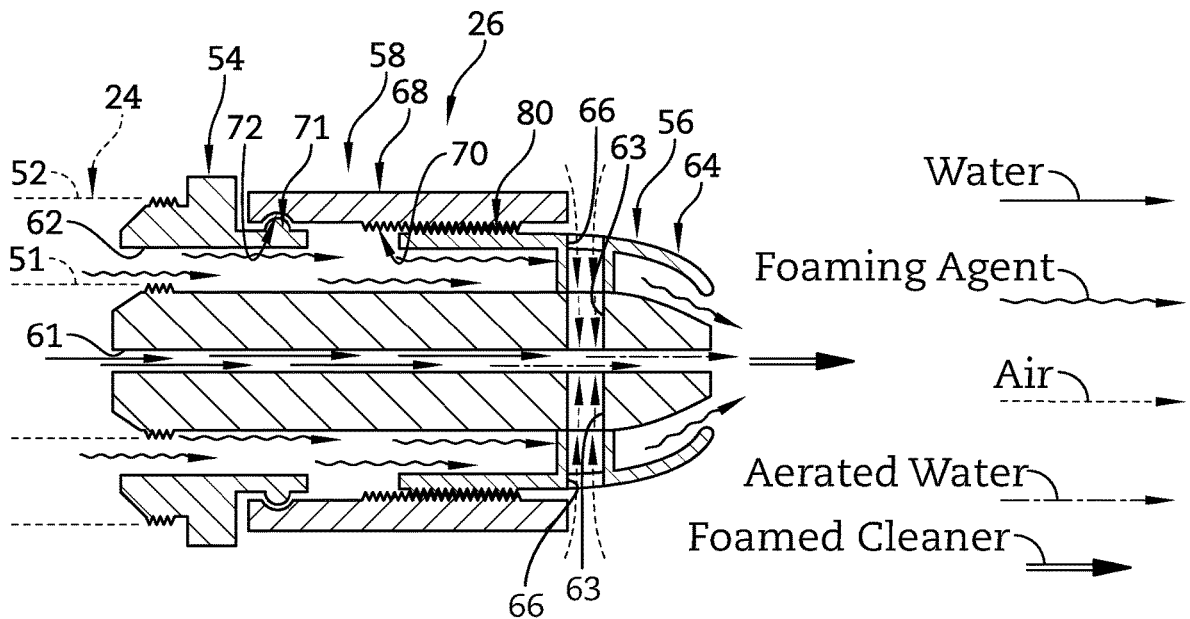
FIG. 3 is a detail cross-sectional view of the aeration dispenser included in the wand of FIGS. 1 and 2 arranged in a foaming configuration which shows that the aeration dispenser is adapted to mix water, foaming cleaner, and air to produce the foamed cleaner at the point where the wand discharges into the gas turbine engine so that the cellular integrity of the foam is maximized during cleaning of the gas turbine engine.

The aeration dispenser 26 is configured to mix water and foaming cleaner from mobile supply unit 18 with air to produce foamed cleaner as suggested in FIG. 3. More specifically, the aeration dispenser 26 aerates water which is then mixed with foaming cleaner as it exits the aeration dispenser 26 to produce foamed cleaner as the mixed contents exit the aeration dispenser 26 so that the foam is formed near the parts to be cleaned and maintains its structural integrity as it moves through the gas turbine engines 12. The illustrative aeration dispenser 26 is adjustable and may be used to regulate the amount of foaming cleaner that is mixed with aerated water. The illustrative aeration dispenser 26 is further adjustable to regulate the amount of air mixed in with water flowing through the aeration dispenser 26. In some embodiments, the aeration dispenser 26 may further be adjustable to regulate the amount of water flowing through the aeration dispenser 26.

Figure 4:
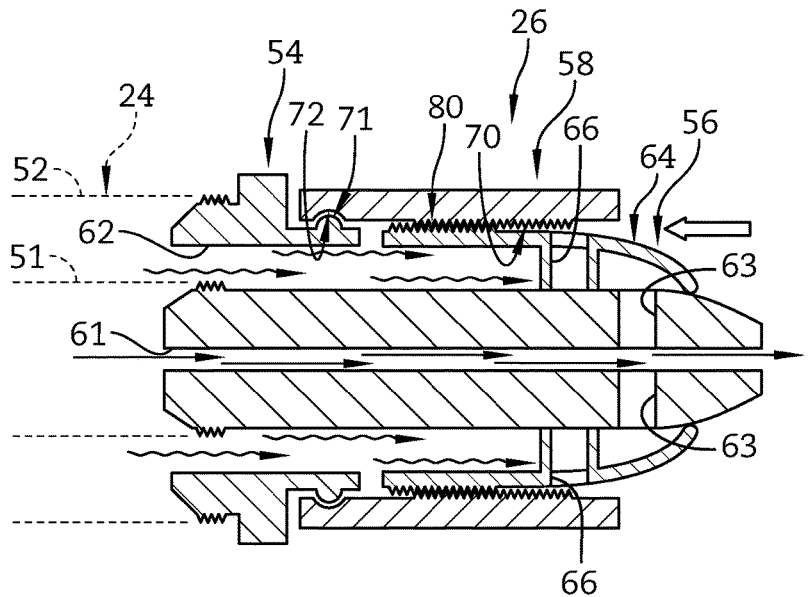
FIG. 4 is a view similar to FIG. 3 of the aeration dispenser included in the wand of FIGS. 1 and 2 arranged in a rinsing configuration showing that the aeration dispenser is adapted to block foaming cleaner from discharging into the gas turbine engine while still providing water to the gas turbine engine so that the engine may be rinsed.

In the illustrative embodiment, the aeration dispenser 26 includes a coupling 54, a regulator 56, and an actuator 58 as shown in FIGS. 3 and 4. The coupling 54 is adapted to be coupled to the conduit 24 to receive water and foaming cleaner from the mobile supply unit 18. The regulator 56 moves relative to the coupling 54 and allows adjustment of foaming cleaner flow and air flow. The actuator 58 is connected to the coupling 54 and the regulator 58 so as to move the regulator 58 relative to the coupling 54.

The coupling 54 forms a water passage 61, a foaming cleaner passage 62, and aeration passages 63 as shown, for example, in FIGS. 3 and 4. The water passage 61 is coupled for fluid communication with the first tube 51 of the conduit 24 to receive water from the mobile supply unit 18. The foaming cleaner passage 62 is coupled for fluid communication with the second tube 52 of the conduit 24 to receive foaming cleaner from the mobile supply unit 18. The aeration passages 63 extends from the water passage 61 to the foaming cleaner passage 62. In the illustrative embodiment, the water passage 61 and the foaming cleaner passage 62 are coaxial and the aeration passage extends outwardly from the shared axis of the water passage 61 and the foaming cleaner passage 62.

The regulator 56 is mounted for movement relative to the coupling 54 between an opened position, as shown in FIG. 3, and a closed position as shown in FIG. 4. The regulator 56 is adapted to selectively restrict the foaming cleaner passage 62 and to selectively restrict the amount of air allowed to move from the atmosphere into the water passage 61 through the aeration passages 63. In the illustrative embodiment, restriction of the foaming cleaner passage 62 and the amount of air allowed through the aeration passages 63 is coordinated such that the proper amount of air for a corresponding amount of foaming cleaner is mixed to produce foamed cleaner. In other embodiments, regulation of the foaming cleaner, air, and/or water may be independently regulated.

The regulator 56 illustratively includes a closure body 64 and atmospheric passages 66 that move with the closure body 64 as suggested in FIGS. 3 and 4. The closure body 64 is illustratively conical and moves along the coupling 54 to selectively restrict or close the foaming cleaner passage 62 formed by the coupling 54. The atmospheric passages 66 extend inwardly from the closure body 64 at various circumferential locations around the aeration dispenser 26.

In the illustrative embodiment, the atmospheric passages 66 are in fluid communication with the atmosphere around the aeration dispenser 26 and selectively conduct air to the aeration passages 63 of the coupling 54. More particularly, the atmospheric passages 66 move with the closure body 64 relative to the coupling 54 to selectively couple the aeration passages 63 with the atmosphere around the aeration dispenser 26 when the regulator is in the opened position as suggested in FIG. 3. The atmospheric passages 66 also move with the closure body 64 relative to the coupling 54 to disconnect the aeration passages 63 from the atmosphere around the aeration dispenser 26 when the regulator is in the closed position as suggested in FIG. 4.

The actuator 56 is illustratively manually operated by rotating the actuator 56 relative to the coupling 52 as suggested in FIGS. 3 and 4. In some embodiments, the actuator 56 may be electronically or pneumatically operated. In the illustrative embodiment, the actuator 56 includes a tubular body 68 and a plurality of threads 70 as shown in FIGS. 3 and 4. The tubular body 68 is coupled to the coupling 54 for rotation relative to the coupling 54 by an annular protrusion 71 received in an annular track 72 formed in the tubular body 68. The threads 70 are intermeshed with threads 80 formed on the exterior of the closure body 64 of the regulator 56. When the actuator 56 is rotated, the threads 70 of the actuator 56 interact with the threads 80 of the regulator 56 to cause the regulator to slide along the coupling 54 between the opened position and the closed position.

According to one method of cleaning a gas turbine engine, a user may couple the inlet assembly 22 of the wand 20 to the water source 32 and to the foaming cleaner source 34 of the mobile supply unit 18 as suggested in FIG. 1. The user may adjust the aeration dispenser 26 by rotating the actuator 58 to move the regulator 56 to the opened position or a partially-opened position to achieve a desired foaming rate. The user may then insert the wand 20 into the aircraft 14 so that the aeration dispenser 26 is adjacent to the inlet of the engine core 16 as suggested in FIG. 2.

The method may further include a user opening the valves 43, 44 to start the flow of foamed cleaner into the engine core 16 thereby discharging foamed cleaner produced by mixing foaming cleaner with air into the engine core 16 of a gas turbine engine 12 as suggested in FIGS. 1-3. The foamed cleaner may be produced from the foaming cleaner by the aeration dispenser 26 arranged at an end of the wand 20. The engine core 16 may be dry motored so that rotatable components of the engine core 16 turn and pull the foamed cleaner through the engine core 16 to clean dirt and grime from the engine core 16.

In some embodiments of the method, the user may adjust the aeration dispenser 26 by rotating the actuator 58 to move the regulator 56 to the closed position to block the flow of foaming cleaner and of air into the water as suggested in FIG. 4. The user may allow at least the first valve 43 to remain open thereby discharging water into the engine core 16 to further clean/rinse the engine core 16 as suggested in FIG. 4.

Figure 5:
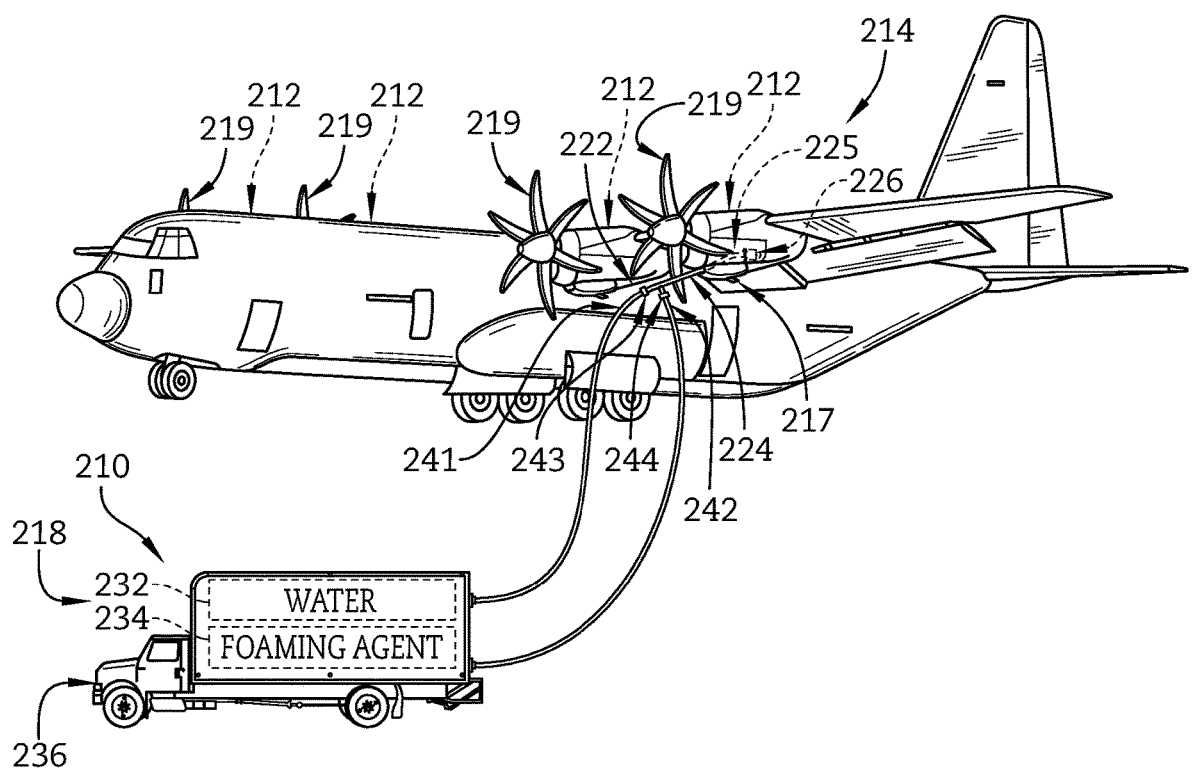
FIG. 5 is a perspective view of an aircraft and another cleaning system for cleaning gas turbine engines included in the aircraft showing that the cleaning system includes a wand with an expandable inlet filler for conducting cleaner into the gas turbine engine without allowing cleaner to leak backward out of the aircraft before passing through the gas turbine engine.
Figure 6:
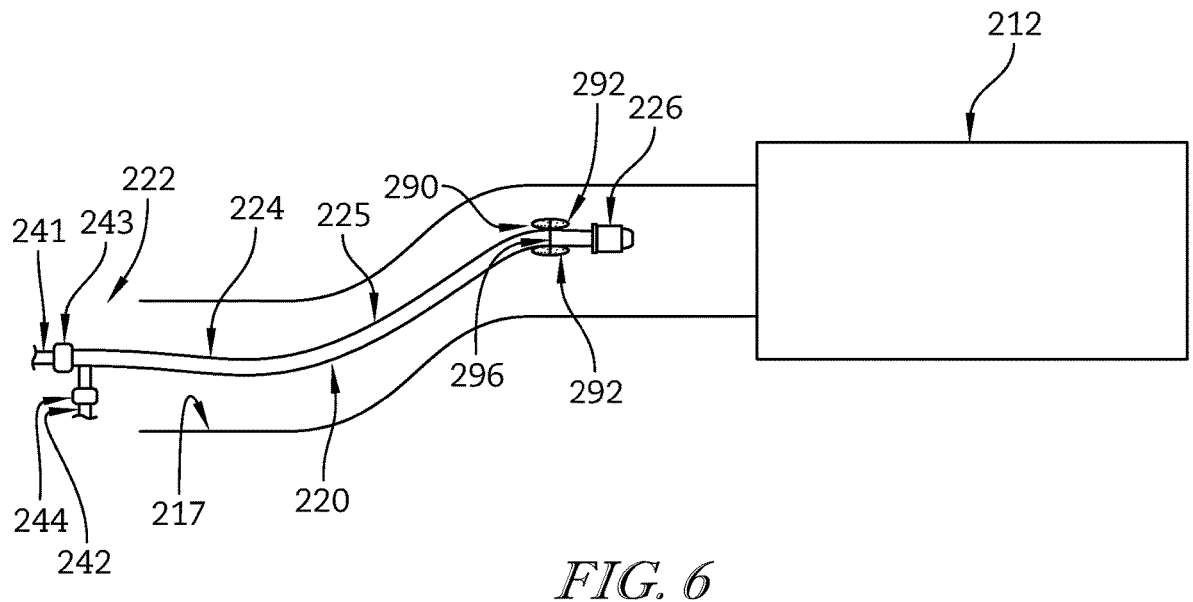
FIG. 6 is a partially-diagrammatic view showing the wand of FIG. 5 inserted into an inlet of the aircraft ahead of the gas turbine engine when the inlet filler is in a stowed configuration before being expanded to block leakage of cleaner out of the inlet.
Figure 7:
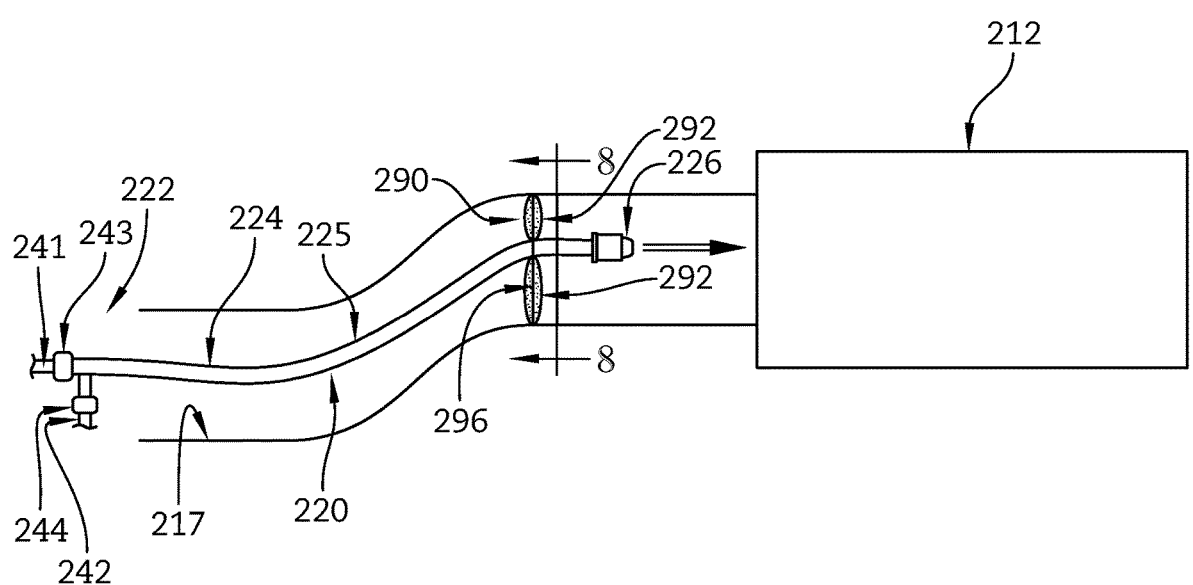
FIG. 7 is a view similar to FIG. 6 showing the wand of FIG. 5 inserted into an inlet of the aircraft ahead of the gas turbine engine when the inlet filler is in a use configuration blocking leakage of cleaner out of the inlet.

Another illustrative cleaning system 210 adapted for use with another aircraft 214 is shown in FIGS. 5-7. The cleaning system 210 is substantially similar to the cleaning system 10 shown in FIGS. 1-4 and described herein. Accordingly, similar reference numbers in the 200 series indicate features that are common between the cleaning 10 and the cleaning system 210. Further, the method of cleaning a gas turbine engine using the cleaning system 210 is similar to the method of cleaning a gas turbine engine using the cleaning system 10 described herein. The description of the cleaning system 10 and its method of use to clean a gas turbine engine are hereby incorporated by reference to apply to the cleaning system 210, except in instances when it conflicts with the specific description and drawings of the cleaning system 210.

Unlike the cleaning system 10, the cleaning system 210 includes a wand 220 having a conduit 224 that is shaped with a jog 225 for use in an upwardly extending air inlet 217 as shown in FIGS. 6 and 7. The inlet assembly 222 and the aeration dispenser 226 are substantially similar to the inlet assembly 22 and the aeration dispenser 26 of the wand 20 described herein. Upwardly extending air inlets, like air inlet 217, may be used in aircraft with gas turbine engines 212 that drive propellers 219 as shown in FIG. 5.

Also unlike the cleaning system 10, the wand 220 the cleaning system 210 also includes an inlet filler 290 adapted to block leakage of foamed cleaner, water, and or other cleaners out of the upwardly extending air inlet 217 as suggested in FIG. 7. The inlet filler 290 is coupled to the conduit 224 between the inlet assembly 222 and the aeration dispenser 226 as shown in FIGS. 6 and 7. The inlet filler 290 is expandable from a stowed configuration, shown in FIG. 6, to a use configuration shown in FIG. 7. In the stowed configuration, the inlet filler 290 is collapsed toward the conduit 224. In the use configuration the inlet filler extends away from the conduit 224.

Figure 8:
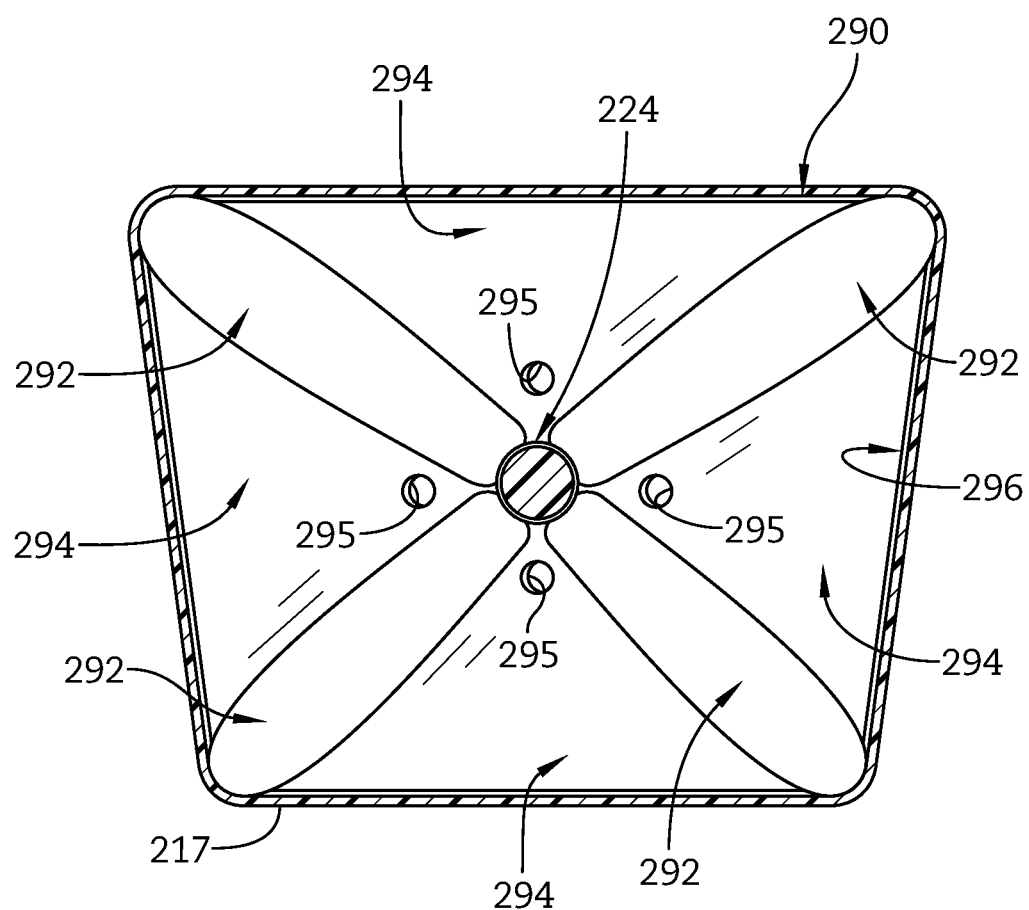
FIG. 8 is a cross sectional view of FIG. 7 taken at line 8-8 in FIG. 7.

In the illustrative embodiment, the inlet filler 290 includes a plurality of inflatable bladders 292 coupled to the conduit 224 and a plurality of web panels 294 that extend between the inflatable bladders 292 as shown in FIGS. 6-8. The inflatable bladders 292 are generally evacuated when the inlet filler 290 is in the stowed configuration to allow the wand 220 to be inserted into and removed from the inlet 217 as suggested in FIG. 6. The inflatable bladders 292 are generally inflated when the inlet filler 290 is in the use configuration to expand the inlet filler 290 and block cleaner from leaking out of the inlet 217 as suggested in FIGS. 7 and 8. In some embodiments, a single inflatable bladder may extend around the conduit and may be inflated to fill (or partially fill) the inlet 217 to block leakage of cleaner out of the inlet 217.

In the illustrative embodiment, the web panels 294 are formed to include apertures 295 adapted to allow some air to pass through the inlet to the gas turbine engine 212 during dry motoring of the engine 212 as shown in FIG. 8. The apertures 295 are illustratively spaced apart from the edges of the inlet filler 290 adjacent to the conduit 224.

The inlet filler 290 may also include a biasing member 296 adapted to bias the inlet filler 290 toward the stowed configuration as suggested in FIGS. 6 and 8. In the illustrative embodiment, the biasing member 296 may be an elastic band that also engages the edges of the inlet 217 when the inlet filler is in the use configuration to create a seal along the edges of the inlet 217 as shown in FIG. 8. In some embodiments, the conduit 224 may include a third tube 253 adapted to carry pressurized gas to the inflatable bladders 292 from outside the inlet 217 to expand the inlet filler 290 and stretch the biasing member 296.

In other embodiments, the inlet filler 290 includes a mechanically expanding linkage adapted to expand within the inlet 217. In one example, the linkage may resemble the mechanism for an umbrella and may move a plurality of web panels outwardly from the conduit 224.

In some embodiments, the inlet filler 290 may be used with wands having non-aerating dispensers. In one example, the inlet filler 290 may be used with wands that distribute foamed cleaner produced in the mobile supply unit, in the inlet, and/or in the conduit. In another example, the inlet filler 290 may be used with wands that distribute non-foamed cleaners (e.g. water, soap solution, etc.) to block the cleaners from leaking out of an inlet.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A wand adapted for use with a gas turbine engine to clean the gas turbine engine, the wand comprising
   an inlet assembly configured to be coupled to a liquid source,
   a dispenser configured to discharge liquid into the gas turbine engine core,
   a conduit that extends from the inlet assembly to the dispenser that is adapted to carry liquid from the inlet assembly to the dispenser, and
   an inlet filler configured to selectively expand from a stowed configuration in which the inlet filler is collapsed to a use configuration in which the inlet filler extends away from other components of the wand, the inlet filler including a plurality of inflatable bladders that expand when filled with a gas and at least one web panel that extends between the inflatable bladders to provide a structure sized to fill an air inlet associated with a gas turbine engine core and block liquid from leaking away from the gas turbine engine core.

2. The wand of claim 1, wherein the inlet filler includes a biasing member adapted to bias the inlet filler toward the stowed configuration.

3. The wand of claim 2, wherein the biasing member is an elastic band that extends around an outer edge of the rest of the inlet filler such that the elastic band engages edges of the air inlet when the inlet filler is expanded to the use configuration within the air inlet.

4. The wand of claim 1, wherein the at least one web panel is formed to include apertures sized to allow air to pass through the air inlet to the gas turbine engine core during dry motoring of the gas turbine engine core when the inlet filler is expanded to the use configuration within the air inlet.

5. The wand of claim 4, wherein the apertures are spaced apart from the outer edge of the inlet filler such that liquid pooling adjacent the outer edge is blocked from leaking away from the gas turbine engine core.

6. The wand of claim 1, wherein the conduit includes a first tube configured to carry the liquid and a second tube configured to carry pressurized gas to the inflatable bladders.

7. The wand of claim 6, wherein the conduit includes a third tube configured to carry a cleaning agent from the inlet assembly to the dispenser.

8. The wand of claim 7, wherein the dispenser is an aeration dispenser configured to mix liquid from the first tube, foaming cleaner from the second tube, and air from the atmosphere to produce foamed cleaner.

9. The wand of claim 8, wherein the aeration dispenser includes a coupling that forms a water passage in fluid communication with the first tube, a foaming cleaner passage in fluid communication with the third tube, and a regulator mounted for movement relative to the coupling to selectively restrict the foaming cleaner passage.

10. The wand of claim 9, wherein the regulator includes an atmospheric passage adapted to move relative to the coupling to selectively couple the aeration passage with the atmosphere around the aeration dispenser.

11. A wand adapted for use with a gas turbine engine to clean the gas turbine engine, the wand comprising
- an inlet assembly configured to be coupled to a liquid source,
- a dispenser configured to discharge liquid into the gas turbine engine core,
- a conduit that extends from the inlet assembly to the dispenser that is adapted to carry liquid from the inlet assembly to the dispenser, and
- an inlet filler configured to selectively expand from a stowed configuration in which the inlet filler is collapsed to a use configuration in which the inlet filler extends away from other components of the wand, the inlet filler including an expansion mechanism and at least one web panel that extends between components of the expansion mechanism to provide a structure sized to fill an air inlet associated with a gas turbine engine core and block liquid from leaking away from the gas turbine engine core,
- wherein the at least one web panel is formed to include apertures sized to allow air to pass through the air inlet to the gas turbine engine core during dry motoring of the gas turbine engine core when the inlet filler is expanded to the use configuration within the air inlet, and wherein the apertures are spaced apart from the outer edge of the inlet filler such that liquid pooling adjacent the outer edge is blocked from leaking away from the gas turbine engine core,
- wherein the expansion mechanism includes a plurality of inflatable bladders.

12. The wand of claim 11, wherein the expansion mechanism includes an expanding linkage configured to expand within the air inlet of the gas turbine engine core.

13. The wand of claim 11, wherein the conduit includes a first tube configured to carry the liquid and a second tube configured to carry pressurized gas to the inflatable bladders.

14. The wand of claim 13, wherein the conduit includes a third tube configured to carry a cleaning agent from the inlet assembly to the dispenser.

15. The wand of claim 14, wherein the dispenser is an aeration dispenser that includes a coupling that forms a water passage in fluid communication with the first tube, a foaming cleaner passage in fluid communication with the third tube, and a regulator mounted for movement relative to the coupling to selectively restrict the foaming cleaner passage, and wherein the regulator includes an atmospheric passage adapted to move relative to the coupling to selectively couple the aeration passage with the atmosphere around the aeration dispenser.

16. The wand of claim 11, wherein the inlet filler includes a biasing member adapted to bias the inlet filler toward the stowed configuration.

17. The wand of claim 16, wherein the biasing member is an elastic band that extends around an outer edge of the rest of the inlet filler such that the elastic band engages edges of the air inlet when the inlet filler is expanded to the use configuration within the air inlet.

18. The wand of claim 11, wherein at least one web panel extends between the plurality of inflatable bladders to provide a structure sized to fill an air inlet associated with a gas turbine engine core and block liquid from leaking away from the gas turbine engine core.

* * * * *